(12) United States Patent
Iwamoto et al.

(10) Patent No.: US 11,946,290 B2
(45) Date of Patent: Apr. 2, 2024

(54) DELIVERY RACK AND DELIVERY VEHICLE

(71) Applicant: TOYOTA JIDOSHA KABUSHIKI KAISHA, Toyota (JP)

(72) Inventors: Kunihiro Iwamoto, Nagakute (JP); Yuta Itozawa, Nagoya (JP); Hirotaka Komura, Tokyo (JP); Yutaro Takagi, Tokyo (JP); Yoshiaki Nakamoto, Nisshin (JP); Junya Ota, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 353 days.

(21) Appl. No.: 17/548,235

(22) Filed: Dec. 10, 2021

(65) Prior Publication Data

US 2022/0251881 A1     Aug. 11, 2022

(30) Foreign Application Priority Data

Feb. 5, 2021   (JP) ................................ 2021-017308

(51) Int. Cl.
*E05B 65/462*     (2017.01)
*A47B 88/407*     (2017.01)
(Continued)

(52) U.S. Cl.
CPC .......... *E05B 65/462* (2013.01); *A47B 88/407* (2017.01); *A47B 88/437* (2017.01); *B62B 3/005* (2013.01); *E05B 47/0001* (2013.01)

(58) Field of Classification Search
CPC ..... A47B 88/40; A47B 88/403; A47B 88/407; A47B 88/437; B62B 3/005; E05B 65/462; E05B 47/0001
See application file for complete search history.

(56) References Cited

U.S. PATENT DOCUMENTS 1,552,511 A * 9/1925 Secoy ................... E05B 65/462
                                                    312/221
3,868,123 A * 2/1975 Berg ....................... B62B 3/005
                                                    312/249.11
(Continued)

FOREIGN PATENT DOCUMENTS

EP          3566900 A1 * 11/2019 ............. B60L 50/60
JP      2006-037544 A     2/2006
(Continued)

*Primary Examiner* — Lori Lyjak
(74) *Attorney, Agent, or Firm* — Oliff PLC

(57) ABSTRACT

A rack includes: a casing; M (an integer not less than three) pairs of supports that are provided inside the casing so as to extend in a depth direction and arrayed at regular intervals in a predetermined direction (a height direction or a left-right direction); and a lock mechanism. The rack can house all returnable containers of one or more prespecified sizes along the respective pairs of supports. The lock mechanism includes N (an integer not less than two and meeting $N<M \leq 2^N-1$) shafts that are movable in the predetermined direction. Branches are provided on the shafts such that a combination of engagement and disengagement between the branches and holes provided in protrusions of the returnable container is different in each of the returnable containers housed on the respective M pairs of supports.

11 Claims, 11 Drawing Sheets

(51) Int. Cl.
*A47B 88/437* (2017.01)
*B62B 3/00* (2006.01)
*E05B 47/00* (2006.01)

(56) References Cited

U.S. PATENT DOCUMENTS

| | | | | |
|---|---|---|---|---|
| 3,976,343 | A * | 8/1976 | Breckner | E05B 65/462 |
| | | | | 312/219 |
| 5,503,440 | A * | 4/1996 | Peccoux | E05C 9/026 |
| | | | | 292/DIG. 21 |
| 9,986,825 | B1 * | 6/2018 | Lin | A47B 47/0083 |
| 10,750,632 | B1 * | 8/2020 | Conroy | H05K 7/1489 |
| 11,554,706 | B2 * | 1/2023 | Radetzki | B62B 3/005 |
| 2013/0063012 | A1 * | 3/2013 | Lu | B25H 3/06 |
| | | | | 312/334.7 |
| 2013/0199016 | A1 * | 8/2013 | Found | A47B 88/40 |
| | | | | 211/85.29 |
| 2017/0340105 | A1 * | 11/2017 | Knighton | B62B 3/005 |

FOREIGN PATENT DOCUMENTS

| | | | |
|---|---|---|---|
| JP | 2017-145117 A | | 8/2017 |
| KR | 19980058665 U | * | 10/1998 |

* cited by examiner

FIG. 8

| TIER | 31a | 31b | 31c | 31d |
|------|-----|-----|-----|-----|
| 15 | 1 | 1 | 1 | 1 |
| 14 | 1 | 1 | 1 | 0 |
| 13 | 1 | 1 | 0 | 1 |
| 12 | 1 | 1 | 0 | 0 |
| 11 | 1 | 0 | 1 | 1 |
| 10 | 1 | 0 | 1 | 0 |
| 9 | 1 | 0 | 0 | 1 |
| 8 | 1 | 0 | 0 | 0 |
| 7 | 0 | 1 | 1 | 1 |
| 6 | 0 | 1 | 1 | 0 |
| 5 | 0 | 1 | 0 | 1 |
| 4 | 0 | 1 | 0 | 0 |
| 3 | 0 | 0 | 1 | 1 |
| 2 | 0 | 0 | 1 | 0 |
| 1 | 0 | 0 | 0 | 1 |

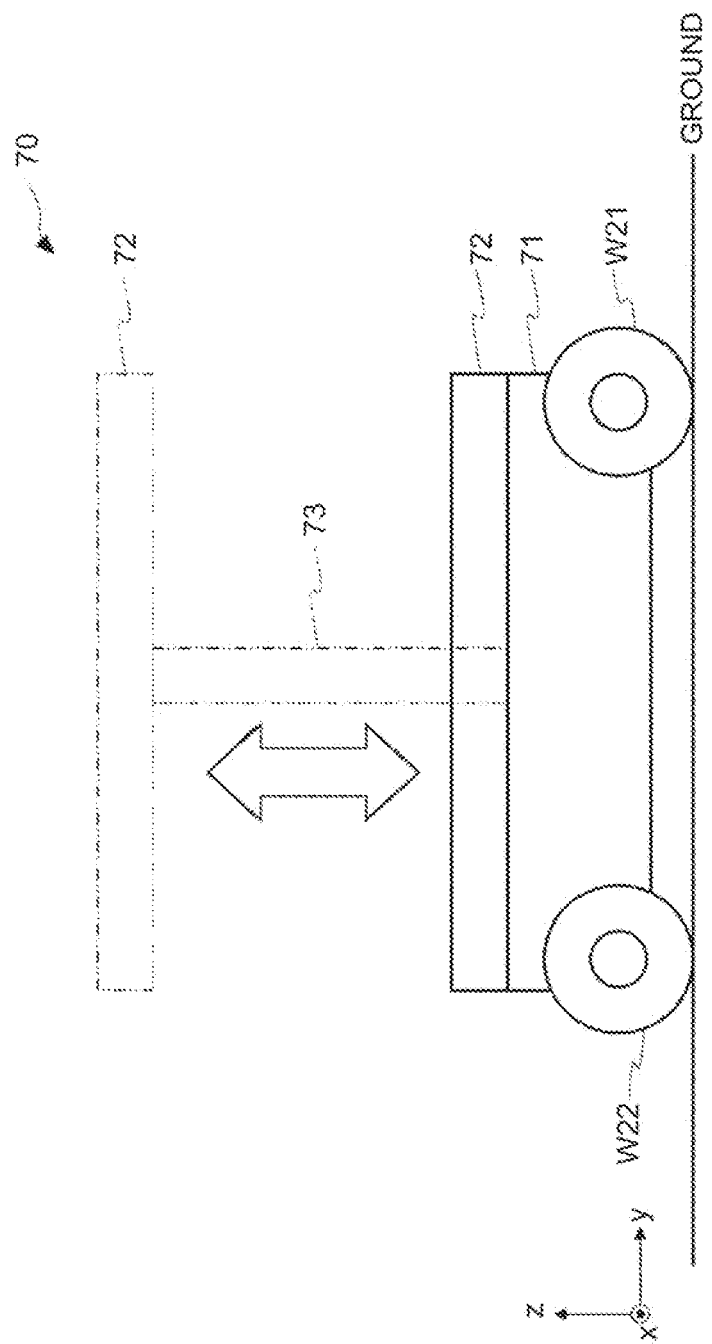

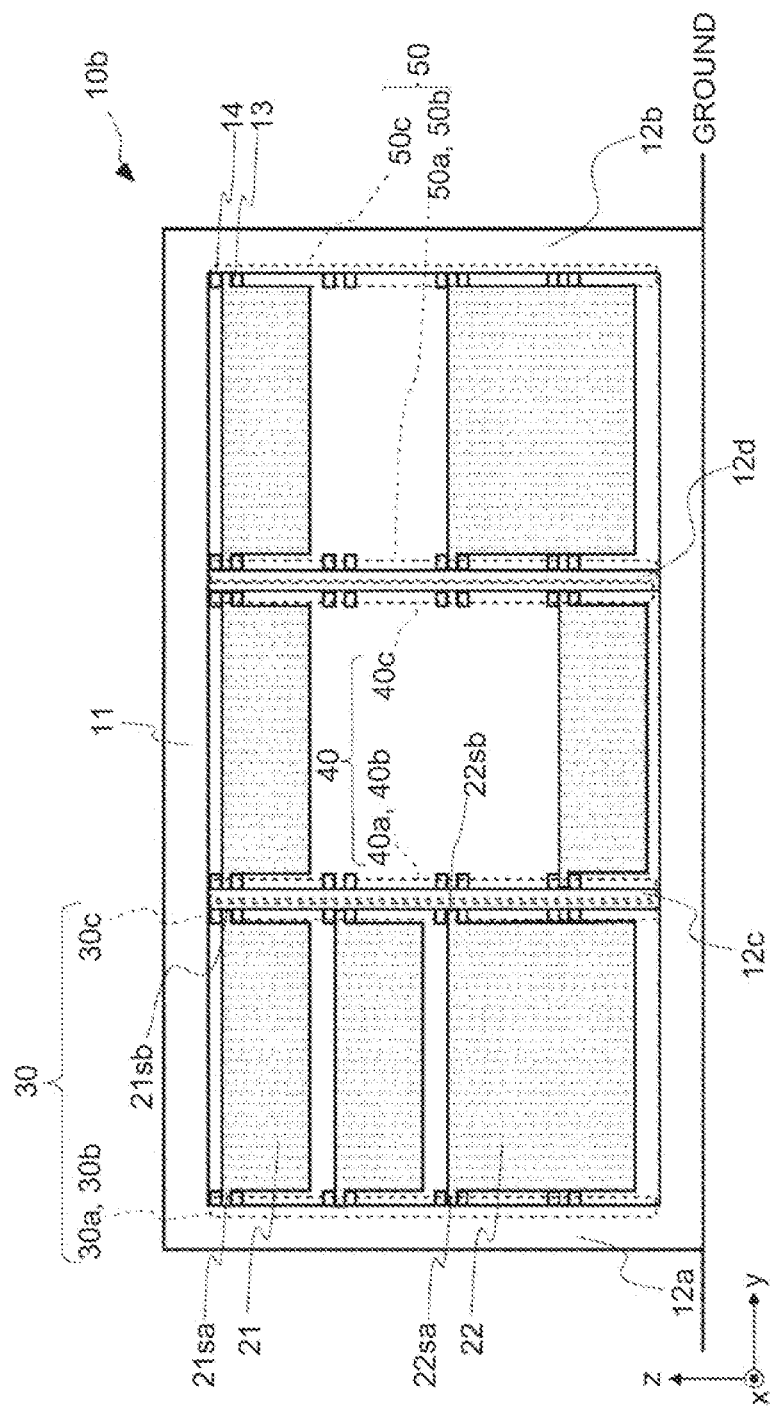

DELIVERY RACK AND DELIVERY VEHICLE

CROSS-REFERENCE TO RELATED APPLICATION

This application claims priority to Japanese Patent Application No. 2021-017308 filed on Feb. 5, 2021, incorporated herein by reference in its entirety.

BACKGROUND

1. Technical Field

This disclosure relates to a delivery rack and a delivery vehicle.

2. Description of Related Art

Delivery of articles is desired to be automated and streamlined. The technique of delivering articles by housing them in returnable containers (also called returnable boxes) is widely known. Japanese Unexamined Patent Application Publication No. 2017-145117 (JP 2017-145117 A) discloses an article carrying apparatus in which a lock mechanism is disposed at a front-side end of an article housed in a housing part.

SUMMARY

The present inventors have been developing a delivery rack and a delivery vehicle in which returnable containers of one or more prespecified sizes can be housed while being supported so as to be slidable along respective pairs of supports that are provided inside a casing so as to extend in a depth direction and arrayed at regular intervals in an up-down direction or a left-right direction.

In the process, the present inventors have been working on a lock mechanism that can independently lock and unlock the returnable containers housed in the rack. For example, it is conceivable to provide an electric lock, such as a solenoid lock, for each pair of supports, which, however, raises a problem that the manufacturing costs of the delivery rack and the delivery vehicle increase due to a driving source (actuator or the like) provided for each electric lock.

For example, in the article carrying apparatus described in JP 2017-145117 A, the lock mechanism is provided for each article housed in the housing part. If a solenoid lock is provided for each of the housing parts corresponding to the respective articles in this article carrying apparatus, the manufacturing cost increases due to a driving source required for each solenoid lock.

Having been made in view of these circumstances, this disclosure provides a delivery rack and a delivery vehicle in which all returnable containers of one or more prespecified sizes can be housed in the rack, and which allow each returnable container to be independently and easily locked and unlocked while keeping the manufacturing cost down as much as possible.

A delivery rack according to one aspect of this disclosure includes: a casing; M pairs of supports, with M being an integer not less than three, that are provided inside the casing so as to extend in a depth direction and arrayed in M tiers at regular intervals in a predetermined direction that is one of an up-down direction and a left-right direction; and a lock mechanism that locks returnable containers housed by being supported so as to be slidable along the respective M pairs of supports. The delivery rack is able to house all the returnable containers of one or more prespecified sizes. The lock mechanism includes N shafts, with N being an integer not less than two and meeting $N<M\leq 2^N-1$, that are movable in the predetermined direction and each have a stem that is provided so as to extend across all the M pairs of supports and M branches that branch off from the stem so as to correspond to the respective M pairs of supports. Moving each of the N shafts in the predetermined direction enables switching between engagement and disengagement between the branches of the N shafts and N holes provided in each of the returnable containers housed on the respective M pairs of supports. The branches are provided on the N shafts such that a combination of engagement and disengagement between the branches and the holes is different in each of the returnable containers housed on the respective M pairs of supports.

A delivery vehicle according to one aspect of this disclosure is a delivery vehicle including a rack. The rack has a casing; M pairs of supports, with M being an integer not less than three, that are provided inside the casing so as to extend in a depth direction and arrayed in M tiers at regular intervals in a predetermined direction that is one of an up-down direction and a left-right direction; and a lock mechanism that locks returnable containers housed by being supported so as to be slidable along the respective M pairs of supports. The rack is able to house all the returnable containers of one or more prespecified sizes. The lock mechanism includes N shafts, with N being an integer not less than two and meeting $N<M\leq 2^N-1$, that are movable in the predetermined direction and each have a stem that is provided so as to extend across all the M pairs of supports and M branches that branch off from the stem so as to correspond to the respective M pairs of supports. Moving each of the N shafts in the predetermined direction enables switching between engagement and disengagement between the branches of the N shafts and N holes provided in each of the returnable containers housed on the respective M pairs of supports. The branches are provided on the N shafts such that a combination of engagement and disengagement between the branches and the holes is different in each of the returnable containers housed on the respective M pairs of supports.

As described above, in one aspect of this disclosure, the rack capable of housing all the returnable containers of one or more prespecified sizes adopts the configuration in which activating one or more of the shafts of which the number (N) is smaller than the number (M pairs) of the supports can release the lock on one of the returnable containers. Thus, this configuration has fewer parts that are activated to release the lock. It is therefore possible to independently and easily lock and unlock each returnable container while keeping the manufacturing cost down as much as possible.

Protrusions that protrude from the returnable container toward outer sides in a direction orthogonal to the predetermined direction may slide over the supports, and the holes may be provided in the protrusions. In this configuration, the returnable containers can be locked using the protrusions thereof.

The holes may be provided at ends of the protrusions in a longitudinal direction. In this configuration, the returnable container can be locked in a state of having been slid to a fixed position, which can mitigate the concern that the returnable container may be locked in a state of having been slid halfway.

The lock mechanism may have a driving source that separately and electrically drives each of the N shafts. This configuration makes it possible to independently lock and unlock each returnable container while keeping the manufacturing cost down by reducing the number of the driving sources.

The rack may be able to house returnable containers in L rows, with L being an integer not less than one, in a direction orthogonal to the predetermined direction of the casing, and the rack may include the M pairs of supports and the lock mechanism in each row. In this configuration, the returnable containers can be housed in one row or divided and housed in two or more rows.

The delivery vehicle may be an autonomous vehicle. This configuration can reduce delivery costs.

This disclosure can provide a delivery rack and a delivery vehicle in which all returnable containers of one or more prespecified sizes can be housed in the rack, and which allow each returnable container to be independently and easily locked and unlocked while keeping the manufacturing cost down as much as possible.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a table showing directions of branches provided in each shaft in the lock mechanism of FIG. 7;

FIG. 10 is a schematic side view of a transfer robot; and

FIG. 11 is a schematic side view showing one example of a delivery rack according to a third embodiment.

DETAILED DESCRIPTION OF EMBODIMENTS

Figure 1:
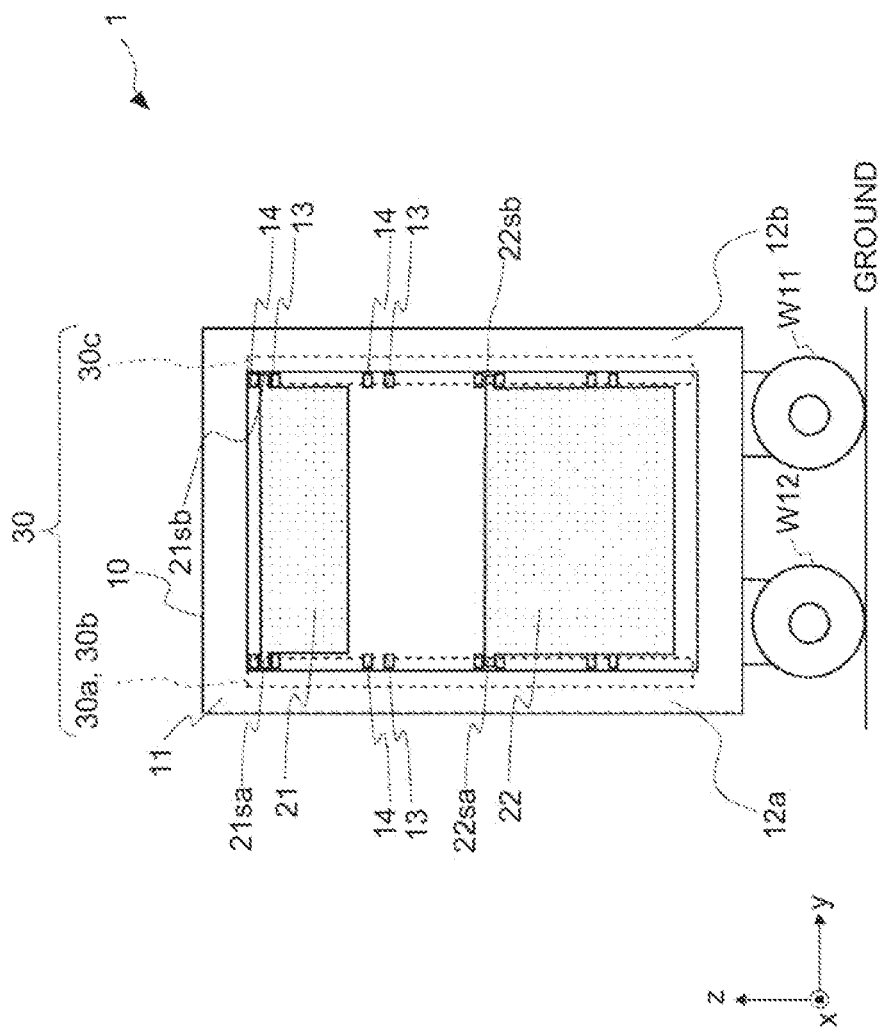
FIG. 1 is a schematic side view showing one example of a delivery vehicle according to a first embodiment.

Specific embodiments will be described in detail below with reference to the drawings. The same or corresponding elements in the drawings are denoted by the same reference signs, and overlapping description will be omitted as necessary to clarify the description.

First Embodiment

FIG. 1 is a schematic side view showing one example of a delivery vehicle according to a first embodiment. The right-handed xyz orthogonal coordinate system shown in FIG. 1 and other drawings is, of course, for the convenience of describing positional relationships among components. Normally, a z-axis positive direction is a vertically upward direction and an xy-plane is a horizontal plane, which applies to all the drawings.

As shown in FIG. 1, a delivery vehicle 1 according to this embodiment is a vehicle that includes a rack 10 and two pairs of wheels W11, W12 and carries articles. The two pairs of wheels W11, W12 are rotatably fixed on a lower side of a casing 11 of the rack 10 and driven by a driving source (not shown), such as a motor. Of course, the number of wheels is not limited to a particular number, and another configuration can also be adopted, such as a configuration in which no wheels are provided and the delivery vehicle 1 is floated and moved using high-pressure air.

Here, the delivery vehicle 1 can include a control unit (not shown) that performs various modes of control relating to the rack 10 etc. These various modes of control can include control of the driving of the wheels W11, W12 in the delivery vehicle 1, and control of the engagement and release of lock (locking and unlocking) by a lock mechanism 30 to be described later. The control unit can include arithmetic units that are each a central processing unit (CPU), for example, and a storage unit, such as a random-access memory (RAM) or a read-only memory (ROM), that stores various control programs, data, etc. Thus, the control unit can function as a computer. The control unit can include an integrated circuit in its configuration.

The delivery vehicle 1 according to the embodiment includes the rack 10 that can house all returnable containers 21, 22, etc. of two or more prespecified sizes. An article to be delivered is delivered by being housed in a returnable container sized to be able to house that article. The returnable containers to be housed, including the returnable containers 21, 22, are not limited to any type of containers; for example, the returnable containers are made of plastic, cardboard, wood, or metal and repeatedly used. While a returnable container itself can constitute an article, normally, an article is delivered in a state of being housed in a returnable container.

As shown in FIG. 1, the rack 10 includes the casing 11 and a plurality of pairs of rails 13 that are provided inside the casing 11 so as to extend in a depth direction (x-axis direction) and arrayed at regular intervals in a height direction (z-axis direction). In the delivery vehicle 1, the casing 11 constitutes a part of a vehicle body. The rails 13 are one example of supports, and here an example where four pairs of rails 13 are provided is described. At a minimum, M (M is an integer not less than three) pairs of supports should be provided inside the casing 11 so as to extend in the depth direction and arrayed in M tiers at regular intervals in the up-down direction.

Thus, the delivery vehicle 1 includes the rack 10 that can house all the returnable containers 21, 22 of two or more prespecified sizes along the respective pairs of rails 13. In FIG. 1 that is a side view, the returnable containers 21, 22 are indicated by hatching to help understanding. The same applies to FIG. 9 and FIG. 11 to be described later.

In this embodiment, the returnable containers 21, 22 of prespecified sizes are equal in the width in the y-axis direction and the depth in the x-axis direction. However, the returnable containers 21, 22 are different from each other in the height in the z-axis direction. The height of the returnable container 21 having the smallest size is designed according to the interval between the rails 13 that are adjacent to each other in the z-axis direction. Of course, the height of the returnable container 21 is smaller than the interval between these rails 13. The height of the returnable container 22 is designed to be about twice as large as the height of the returnable container 21. Thus, the heights of the returnable containers of two or more prespecified sizes are designed to be about integral multiples of the interval between the rails 13 that are adjacent to each other in the z-axis direction.

While the returnable containers have two sizes in the example shown in FIG. 1, the number of sizes may be three or larger. In the example of FIG. 1, other than the returnable containers 21, 22, for example, returnable containers with a height about three times and/or about four times that of the returnable container 21 may be separately provided.

Thus, in this example of the configuration shown in FIG. 1, the four pairs of rails 13 are provided at regular intervals (hereinafter referred to as "intervals B") in the height direction, so that returnable containers of any size can be housed if the width thereof is nearly equal to the width of an inside of the casing 11 and the height thereof is nearly an integral multiple of (in this example, one to four times) the interval B in the height direction. The returnable container 21 is an example of a returnable container with a height as large as the interval B, and the returnable container 22 is an example of a returnable container with a height twice as large as the interval B.

Adopting this configuration makes it possible to house all the returnable containers 21, 22 of two or more prespecified sizes along the rails 13, and streamline the delivery using the returnable containers 21, 22 of two or more prespecified sizes.

Next, housing of the returnable containers using the rails 13 in this example of the configuration will be specifically described.

First, the casing 11 has a configuration in which a top plate provided on a positive side in the z-axis direction, a bottom plate provided on a negative side in the z-axis direction, a front plate 12b provided on a positive side in the y-axis direction, and a back plate 12a provided on a negative side in the y-axis direction are integrally formed. Thus, both lateral sides of the casing 11 are open to allow the returnable containers 21, 22 to be put in and out. Alternatively, doors that can be opened and closed may be provided on both lateral sides of the casing 11 that are open. One of the lateral sides of the casing 11 may be closed.

Each pair of rails 13 is provided so as to rise respectively from the front plate 12b and the back plate 12a of the casing 11 in a substantially perpendicular direction. Since the rails 13 should be able to at least support the returnable containers 21, 22, the rails 13 may be provided so as to extend discontinuously in the depth direction (x-axis direction). Alternatively, instead of the rails 13, short supports may be disposed so as to line up in the depth direction (x-axis direction). Further, a configuration in which the supports are formed by magnets and partially or entirely attract the returnable containers 21, 22 may be adopted.

The returnable container 21 can be put in and out as protrusions 21sa, 21sb protruding from the returnable container 21 toward outer sides in a width direction slide over the pair of rails 13 that are adjacent to the returnable container 21 and face each other. Here, the protrusion 21sa of the returnable container 21 is housed in a state of being placed on the rail 13. To thus house the protrusion 21sa, an auxiliary part 14 that presses the protrusion 21sa so as to be held between the rail 13 and the auxiliary part 14 is provided. The auxiliary part 14 is provided so as to face the rail 13 in the z-axis direction. Like each pair of rails 13, each pair of auxiliary parts 14 corresponding to the respective protrusions 21sa, 21sb is provided so as to rise respectively from the back plate 12a and the front plate 12b in a substantially perpendicular direction. The returnable container 22 is put in and out in the same manner as protrusions 22sa, 22sb thereof slide over the rails 13.

Next, the lock mechanism 30 that is one of the main features of this embodiment will be described.

In this embodiment, the rack 10 includes the lock mechanism 30 that locks the returnable containers 21, 22 each housed by being supported so as to be slidable along one of the M pairs of rails 13.

For example, the lock mechanism 30 can be provided as separate parts on both sides of the casing 11 (in the example of FIG. 1, on the side of the back plate 12a and on the side of the front plate 12b). In the following description, these parts will be referred to as mechanisms 30a, 30b and a mechanism 30c, respectively. The mechanisms 30a, 30b and the mechanism 30c can be provided roughly in regions surrounded by the broken lines in FIG. 1. An example in which the mechanism 30a is located on the positive side in the x-axis direction of FIG. 1 and the mechanisms 30b, 30c are located on the negative side in the x-axis direction of FIG. 1 will be described.

Figure 2:
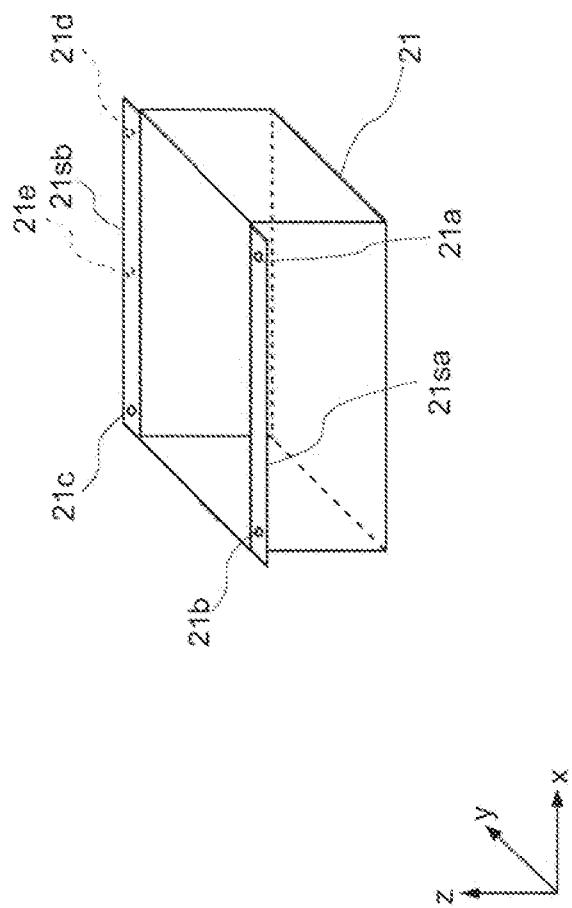
FIG. 2 is a schematic perspective view showing one example of a returnable container housed in the delivery vehicle according to the first embodiment.

Before details of the lock mechanism 30 are described, first, an example of the configuration of the returnable container 21 adapted to the mechanisms 30a to 30c will be described with reference to FIG. 2. In terms of delivery operation, it is desirable that the other containers including the returnable container 22 have basically the same shape except for their sizes. FIG. 2 is a schematic perspective view showing one example of a returnable container housed in the rack 10 of the delivery vehicle 1 according to the first embodiment.

As its shape is illustrated in FIG. 2, the returnable container 21 can have the protrusions 21sa, 21sb that allow the returnable container 21 to slide over the rails 13. Thus, the returnable container 21 can be configured such that the protrusions 21sa, 21sb protruding from the returnable container 21 toward the outer sides in the width direction slide over the rails 13. Here, the width direction refers to a direction that is orthogonal to the up-down direction and, of course, orthogonal also to the depth direction since the protrusions slide over the rails 13.

Further, as shown in FIG. 2, the protrusions 21sa, 21sb are provided with holes 21a, 21b and a hole 21c, respectively. As will be described later, the lock mechanism 30 locks the returnable container 21 using these protrusions 21sa, 21sb. While this is not shown, the returnable container 21 can have a lid that can cover up to the protrusions 21sa, 21sb. When providing such a lid, the lid should have holes at positions corresponding to the respective holes 21a, 21b, 21c of the protrusions 21sa, 21sb.

For convenience, FIG. 2 shows regions 21d, 21e as other examples of the region to provide the hole 21c. When providing four holes unlike in this example of the configuration, these holes can be the holes 21a, 21b, 21c and a hole provided in the region 21d, and when providing five holes, those holes can be the holes 21a, 21b, 21c, a hole provided in the region 21d, and a hole provided in the region 21e.

The returnable containers 21, 22 may be provided with a handle for carrying around. This handle for carrying around is different from a drawer handle for using the returnable containers 21, 22 as drawers. For example, this handle can be a through-hole that is provided near the center of each of the protrusions 21sa, 21sb of the returnable container 21

(between the holes 21a, 21b and near the region 21e) and large enough to put a hand therein to grasp the returnable container 21.

Next, details of the lock mechanism 30 will be described.

The mechanisms 30a, 30b and the mechanism 30c can be provided on the back plate 12a and the front plate 12b, respectively. Details of the mechanisms 30a, 30b, 30c will be described using FIG. 3 to FIG. 6. FIG. 3 to FIG. 6 are schematic side views showing one example of the mechanism of the rail 13 and the lock mechanism 30 and the returnable container 21 in the delivery vehicle 1 as seen from the negative side in the y-axis direction of FIG. 1. The other returnable containers and the corresponding mechanism of the rail 13 and the lock mechanism 30 have the same positional relationship.

Figure 3:
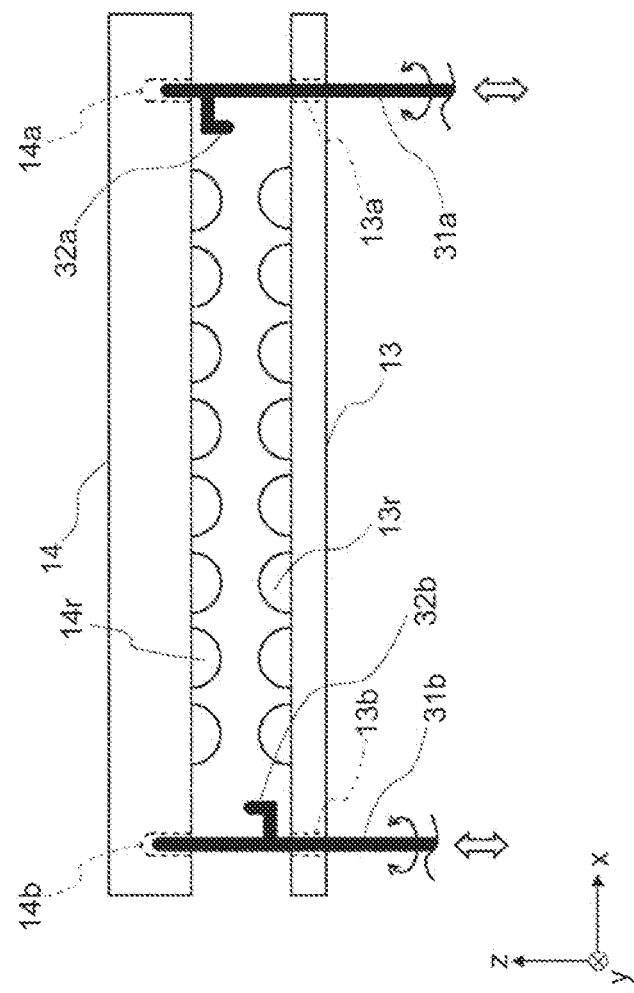
FIG. 3 is a schematic side view showing one example of a rail and a lock mechanism in the delivery vehicle according to the first embodiment.

As shown in FIG. 3, the rail 13 is a roller rail and includes a plurality of rollers 13r. The rollers 13r are made of plastic, for example. The rollers 13r can reduce the coefficient of friction between a lower surface of the protrusion 21sa of the returnable container 21 and the rail 13, as well as can mitigate generation of abrasion dust resulting from sliding of the protrusion 21sa.

Figure 4:
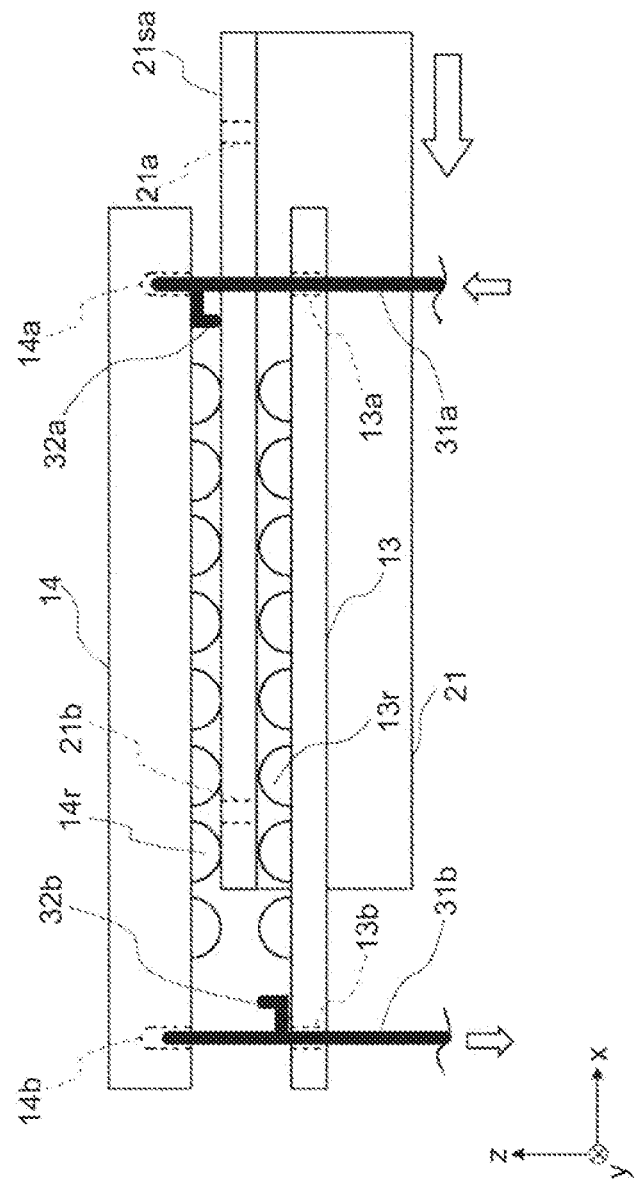
FIG. 4 is a schematic side view showing one example of the rail and the lock mechanism in the delivery vehicle according to the first embodiment.

As shown in FIG. 4, the auxiliary part 14 is a part that presses the protrusion 21sa so as to be held between the rail 13 and the auxiliary part 14. The auxiliary part 14 can be a roller rail like the rail 13 and include a plurality of rollers 14r that are made of plastic, for example. The rollers 14r can reduce the coefficient of friction between an upper surface of the protrusion 21sa of the returnable container 21 and the auxiliary part 14, as well as can mitigate generation of abrasion dust resulting from sliding of the protrusion 21sa. When the returnable container 21 is housed, the protrusion 21sb, like the protrusion 21sa, is also held between the rail 13 and the auxiliary part 14.

As partially shown in FIG. 3, the lock mechanism 30 includes N shafts having N stems 31a, 31b, 31c that are provided so as to extend across all the M pairs of rails 13, and M branches 32a, M branches 32b, and M branches 32c that branch off from these stems so as to correspond to the respective M pairs of rails 13. Here, N is an integer not less than two that meets N<M≤2$^N$−1, and in this example of the configuration, M=4 and N=3.

In more detail, one shaft has one stem and M branches. For example, the mechanism 30a has the stem 31a and the M branches 32a branching off form the stem 31a. In FIG. 3 to FIG. 6, for convenience, only the mechanisms 30a, 30b disposed on the side where the protrusion 21sa is housed are shown, while the stem 31c and the M branches 32c of the mechanism 30c disposed on the side where the protrusion 21sb is housed are not shown.

As indicated by the outlined arrows in FIG. 3, the N shafts are each disposed in such a state as to be able to move up and down separately. For example, the upward and downward motion of the shaft composed of the stem 31a and the branches 32a can be realized by connecting an electric driving source (an actuator or the like) at a predetermined location, such as near a lowermost end or an uppermost end of the stem 31a or near the center of the stem 31a in the z-axis direction. The same applies to the other shafts.

Thus, while this is not shown, the lock mechanism 30 can have driving sources (N driving sources) that separately and electrically drive the respective N (in the example of FIG. 1, four) shafts; in other words, the lock mechanism 30 can have electric locks, such as solenoid locks.

As shown in FIG. 3, to secure the space to allow the shafts to move up and down, the rails 13 and the auxiliary part 14 can have holes 13a, 13b and holes 14a, 14b, respectively, into which the stems 31a, 31b are loosely inserted.

When the lowermost end is connected to the driving source for upward and downward motion, the holes 14a, 14b in the auxiliary part 14 corresponding to the rails 13 on an uppermost end side may be blind holes as shown in the drawings. The other holes provided in the auxiliary parts 14 and the rails 13 should be through-holes. However, if an increase in the widths of the back plate 12a and the front plate 12b is tolerated, the holes 13a, 13b and the holes 14a, 14b may be omitted, and the shafts may be disposed such that the stems 31a, 31b are contained in the back plate 12a while the stem 31c is likewise contained in the front plate 12b.

The lock mechanism 30 is configured such that moving each of the N shafts up and down can switch between engagement and disengagement between the branches of the N shafts (total M×N branches 32a etc.) and the N holes provided in the returnable containers 21 (N holes 21a, 21b, 21c etc. in each returnable container) each housed on one of the M pairs of rails 13. Thus, moving each of the shafts up and down (moving the stems 31a, 31b up and down) can switch the branches 32a, 32b between being engaged with and being disengaged from the holes 21a, 21b.

In the example of FIG. 3 to FIG. 6, the uppermost branches 32a, 32b have L-shapes that are bent (extended) downward and upward, respectively. Thus, lowering the stem 31a causes the branch 32a and the hole 21a to engage with each other, and raising the stem 31a dissolves the engagement. Similarly, raising the stem 31b causes the branch 32b and the hole 21b to engage with each other, and lowering the stem 31b dissolves the engagement. The same applies to the hole 21c; engagement and disengagement are switched according to the upward and downward motion of the stem of the corresponding shaft.

The holes 21a, 21b, 21c can be through-holes but may instead be blind holes. In other words, the branches 32a, 32b are shaped to engage in the holes 21a, 21b, respectively, and the branch 32c is shaped to engage in the hole 21c. These branches may be engaged by, for example, being loosely inserted.

In this embodiment, since the driving sources as described above are provided, it is possible to independently lock and unlock each returnable container while keeping the manufacturing cost down by reducing the number of the driving sources to N, compared with when a lock mechanism is provided that has driving sources for all of a maximum of M returnable containers that can be housed.

Alternatively, as indicated by the arrows in FIG. 3, the stems 31a, 31b and the stem 31c (not shown) can be provided so as to be able to turn around their axes (shaft axes). Thus turning the stems can prevent the branches from interfering with the protrusions 21sa, 21sb of the returnable container 21 while the protrusions 21sa, 21sb are inserted (housed) or removed. However, instead of adopting such a structure of turning the stems, simply disposing leading ends of the branches 32a, 32b and the protrusions 21sa, 21sb with some clearance left therebetween when disengaging the branches 32a, 32b suffices as the structure for preventing interference due to the branches.

In the lock mechanism 30, the branches (the branches 32a, 32b, etc.) of the N shafts are provided such that a combination of engagement and disengagement between the branches and the holes is different in each of the returnable containers including the returnable container 21 that are each housed on one of the M pairs of rails 13. To achieve such a combination, for example, as shown in FIG. 3 to FIG.

6, some of the M branches 32b are extended upward and formed such that the extended portion is loosely inserted into the hole 21a from a lower side, while the others are extended downward and are formed such that the extended portion is loosely inserted into the hole 21a from an upper side.

When the branches of the shafts are disengaged from all the holes 21a, 21b, 21c provided in the returnable container 21, the lock on the returnable container 21 is released (the returnable container 21 is unlocked). On the other hand, when at least one of all the holes 21a, 21b, 21c is engaged with the branch of the shaft, the lock on the returnable container 21 is engaged (the returnable container 21 is locked).

Figure 5:
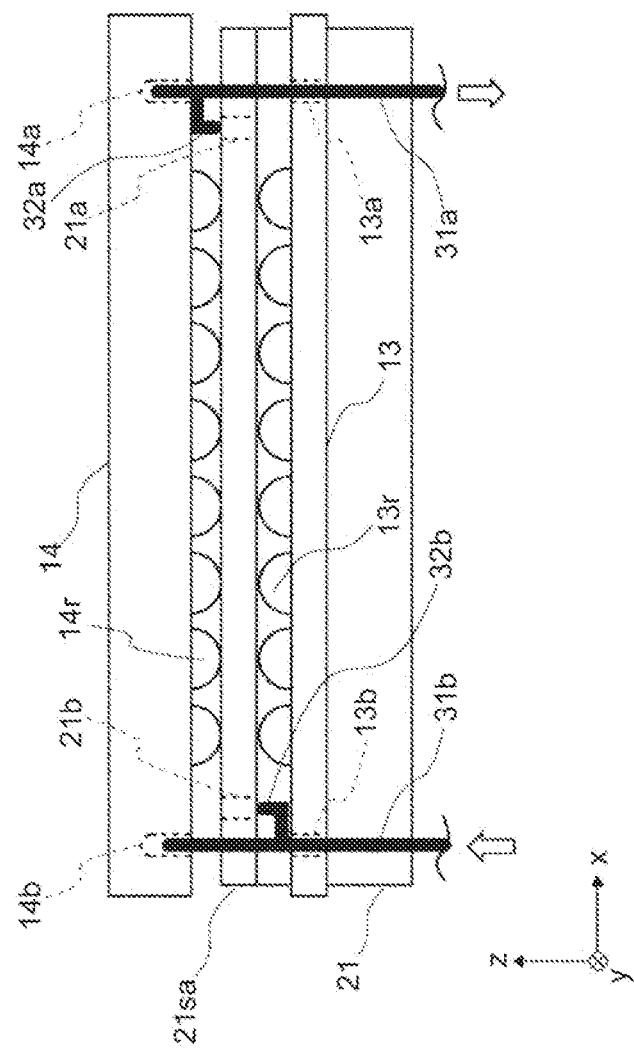
FIG. 5 is a schematic side view showing one example of the rail and the lock mechanism in the delivery vehicle according to the first embodiment.
Figure 6:
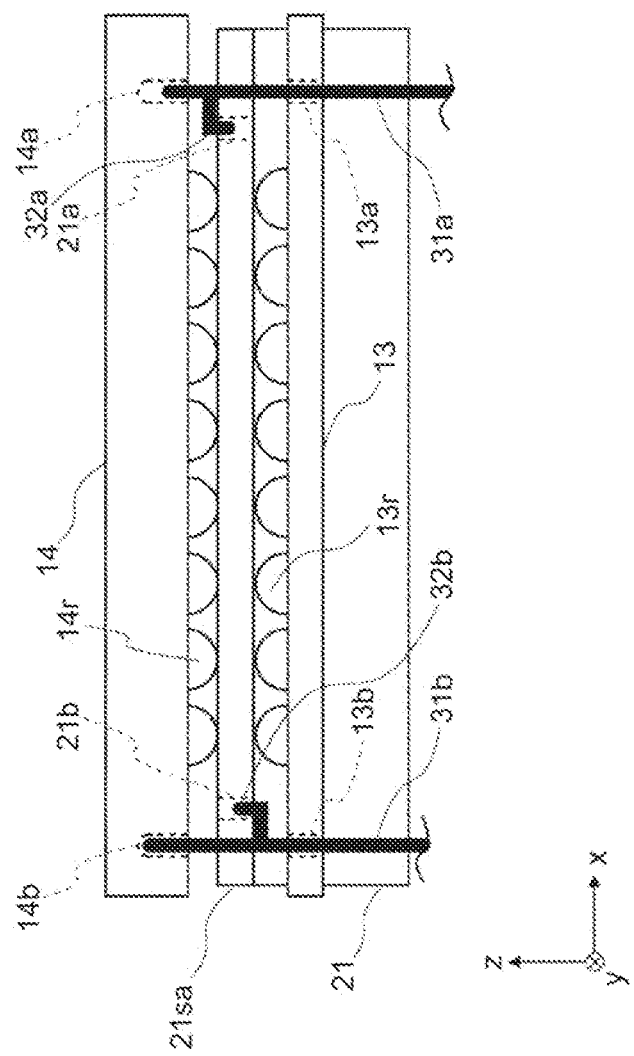
FIG. 6 is a schematic side view showing one example of the rail and the lock mechanism in the delivery vehicle according to the first embodiment.

For convenience, in FIG. 5 and FIG. 6 that are side views, the branch 32a and the hole 21a are shown in a state of not being hidden by the stem 31a, and the branch 32b and the hole 21b are shown in a state of not being hidden by the stem 31b. However, the positions of the branch 32a, the hole 21a, and the stem 31a in the x-axis direction can be aligned with each other, and the positions of the branch 32b, the hole 21b, and the stem 31b in the x-axis direction can also be aligned with each other.

Next, regarding the lock mechanism 30 and the returnable container 21 configured as described above, the procedure of locking the returnable container 21 when the returnable container 21 is inserted into the casing 11 will be described. First, the returnable container 21 that is not yet inserted as shown in FIG. 3 is inserted while being slid over the rails 13 as shown in FIG. 4. The returnable container 21 is slid over the rails 13 with the lock thereon released as shown in FIG. 4. Therefore, the branches 32a, 32b have been retracted upward and downward, respectively.

In a state where the returnable container 21 is stopped at a predetermined position (housed position) on the rails 13 as shown in FIG. 5, activating the lock mechanism 30 can lock the returnable container 21 as shown in FIG. 6. Specifically, the returnable container 21 is fixed to the casing 11 as the branches 32a, 32b move downward and upward, respectively, and engage in the holes 21a, 21b provided in the protrusion 21sa of the returnable container 21. In this case, if a lid (not shown) is provided on the returnable container 21, the lid of the returnable container 21 is locked at the same time. Of course, when the lock mechanism 30 for the returnable container 21 is released, the returnable container 21 becomes movable again as shown in FIG. 5.

Alternatively, a rotary lock mechanism may be adopted in which the branches 32a, 32b have an I-shape, instead of an L-shape, and are rotated and thereby inserted into holes (recesses) formed by columnar spaces (columnar spaces with a semicircular cross-section) provided in side surfaces of the protrusions 21sa, 21sb. In this case, the thicknesses of the protrusions 21sa, 21sb are increased to form the recesses.

As illustrated in FIG. 2 and FIG. 4 to FIG. 6, the holes 21a, 21b, 21c may be provided at ends of the protrusions 21sa, 21sb in a longitudinal direction. This configuration allows the returnable container 21 to be locked in a state of having been slid to a fixed position, which can mitigate the concern that the returnable container 21 may be locked in a state of having been slid halfway.

As has been described above, in the delivery vehicle 1 according to the embodiment, the lock mechanism 30 includes the N shafts that can be moved up and down as described above, and moving each of the N shafts up and down can switch between engagement and disengagement between the branches of the N shafts and the N holes provided in each of the returnable containers that are each housed on one of the M pairs of rails 13. The branches are provided on the N shafts such that a combination of engagement and disengagement between the branches and the holes is a different in each of the returnable containers that are each housed on one of the respective M pairs of the rails 13.

Therefore, when the lock on one returnable container is released by disengaging all the N holes of the returnable container and the branches of the N shafts, each of the other returnable containers than that one is locked as one of the branches of the N shafts engages with the returnable container. This means that it is possible to release the lock on only one of the returnable containers each housed on one of the M pairs of rails 13.

In the lock mechanism 30, each of the N M) shafts can be moved up and down by the driving source. Thus, the number of the driving sources can be reduced by (M–N) compared with a lock mechanism in which a driving source is provided for each of the M pairs of rails 13, so that the manufacturing cost of the rack 10 as well as the manufacturing cost of the delivery vehicle 1 can be kept down.

Here, providing the N shafts can create $2^N$ patterns of the combination of engagement and disengagement, and one of these patterns is a combination in which all the branches and the holes are engaged (locked). Therefore, the maximum number M of the tiers of the rails 13 is $(2^N-1)$ as described above.

Figure 7:
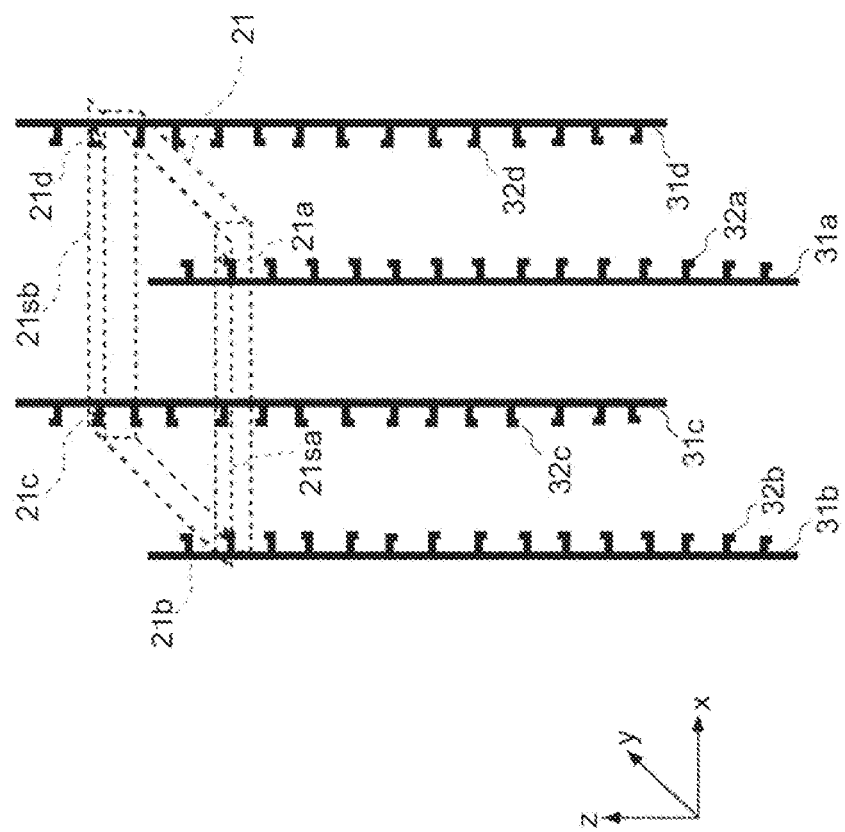
FIG. 7 is a schematic perspective view showing another example of the lock mechanism in the delivery vehicle according to the first embodiment.

In FIG. 1 to FIG. 6, the example of N=3 and M=4 has been mainly described. Another example about the combination of N and M will be described with reference to FIG. 7 and FIG. 8. FIG. 7 is a schematic perspective view showing another example of the lock mechanism in the delivery vehicle according to the first embodiment. FIG. 8 is a table showing the directions of the branches provided on each of the shafts in the lock mechanism of FIG. 7.

In FIG. 7, an example of N=4 is shown. As indicated by the broken lines, the returnable container 21 having four holes 21a, 21b, 21c, 21d can be an object to be housed. The four shafts are provided so as to correspond to these four holes. Stems of the four shafts are represented by stems 31a, 31b, 31c, 31d. The stems 31a, 31b, 31c, 31d are provided with 15 branches 32a, 15 branches 32b, 15 branches 32c, and 15 branches 32d, respectively.

When the stems 31a to 31d are provided with the branches of which those facing upward are represented by "1" and those facing downward are represented by "0" in FIG. 8, the lock on each returnable container can be separately released even when returnable containers are housed in all the 15 tiers.

For example, for the returnable container 21 housed on the rails 13 in the 14th tier, lowering the stems 31a, 31b, 31c to unlock and raising the stem 31d to release the lock allows the returnable container 21 to be taken out. Meanwhile, the returnable containers housed on the rails 13 in the other tiers can be kept locked. When N=4 as in this example, the lock on each returnable container can be separately released even when the rails 13 are disposed in a maximum of 15 $(=2^N-1)$ tiers.

The embodiment has been described based on the assumption that the rack 10 can house all the returnable containers (e.g., the returnable containers 21, 22) of two or more prespecified sizes. Of course, even when the rack 10 is a rack that can house returnable containers of one prespecified size, delivery using these returnable containers of one size can be streamlined and the same effects of the lock mechanism can be achieved. While this is not shown, when a rack that can house returnable containers of one prespecified size is adopted, a plurality of pairs of rails (supports) 13 is arrayed at regular intervals in the height direction (z-axis direction) as in the embodiment, and this regular interval is set to be nearly equal to the height of the returnable containers of one size.

Further, the embodiment is based on the assumption that the M pairs of supports are arrayed in M tiers at regular intervals in the up-down direction and that each of the N shafts is moved up and down (moved in the up-down direction) by the driving source. Alternatively, the M pairs of supports may be provided in M tiers at regular intervals in the left-right direction (one of horizontal directions that is perpendicular to the depth direction), and each of the N shafts may be moved left and right (moved in the left-right direction) by the driving source. This configuration can achieve the same effects. Thus, the M pairs of supports can be provided inside the casing so as to extend in the depth direction and arrayed in M (M is an integer not less than three) tiers at regular intervals in a predetermined direction that is one of the up-down direction and the left-right direction.

Although this will not be described in detail, the rack of such a configuration is, for example, the rack 10 of FIG. 1 turned 90 degrees counterclockwise, for which returnable containers that are open at the upper side can be adopted. Alternatively, adopting returnable containers having a lid to close the opening can eliminate the likelihood of articles falling out of the returnable containers.

As has been described above, in this embodiment, the rack that can house all returnable containers of one or more prespecified sizes adopts the configuration in which activating one or more of the shafts of which the number (N) is smaller than the number (M) of the pairs of rails 13 can release the lock on one of the returnable containers. Thus, this configuration has fewer parts that are activated to release the lock. It is therefore possible to independently and easily lock and unlock each returnable container while keeping the manufacturing cost down as much as possible.

While the embodiment has been described based on the assumption that the N shafts are electrically driven by the driving sources, the embodiment can also adopt a lock mechanism that manually locks and unlocks without having a driving source. For example, the lock mechanism 30 may be a mechanism that mechanically and manually activates the branches 32a, 32b along with the stems 31a, 31b. Thus, the lock mechanism 30 is not limited to a mechanism including a solenoid lock, and may be any mechanism that can restrict the motion of the returnable containers including the returnable container 21 and lock the returnable containers.

In the embodiment, also when such a configuration of manually locking and unlocking the returnable containers is adopted, providing at most as many operating parts as the number of the shafts for a plurality of objects to be locked suffices, so that the manufacturing cost can be kept down. Moreover, in this case, the operating parts for locking and unlocking the returnable containers can be collected in a common region, which has the advantage of facilitating the operation.

The delivery vehicle 1 can be, for example, an autonomous (driverless) vehicle. The depth direction of the rack 10 in the delivery vehicle 1 corresponds to the left-right direction or the front-rear direction of the vehicle. When the vehicle is not an autonomous vehicle, since the driver's seat is commonly disposed on the front side, the inner side in the depth direction is the side of the driver's seat in the left-right direction.

If the delivery vehicle 1 is an autonomous vehicle, delivery costs can be reduced. For example, the delivery vehicle 1 can travel on sidewalks and the like, let alone roads, and can deliver the returnable containers 21, 22 to the vicinity of a place where they are unloaded or a place where they are transferred. When the vehicle becomes unable to travel autonomously, for example, the delivery vehicle 1 may be remotely operated. A delivery person may drive the delivery vehicle 1, and may carry the articles (i.e., the returnable containers 21, 22) to a place where the articles are transferred from the delivery vehicle 1 and transfer them. The place to which the returnable containers 21, 22 are transferred may be, for example, a rack similar to the rack 10.

It is also possible to house articles in the returnable containers 21, 22 with, for example, an order identification information id attached thereto, and deliver the articles in this state. The order identification information id attached to the returnable containers 21, 22 is, for example, a character, symbol, barcode, two-dimensional code, or radio frequency identifier (FRID). For example, a reader (not shown) that can read the order identification information id attached to the returnable containers 21, 22 can be provided in the rack 10 of the delivery vehicle 1 or at other part of the delivery vehicle 1. Thus, the control unit of the delivery vehicle 1 can also perform control such that the lock on a returnable container to be unloaded is released by specifying the order identification information id.

Second Embodiment

Figure 9:
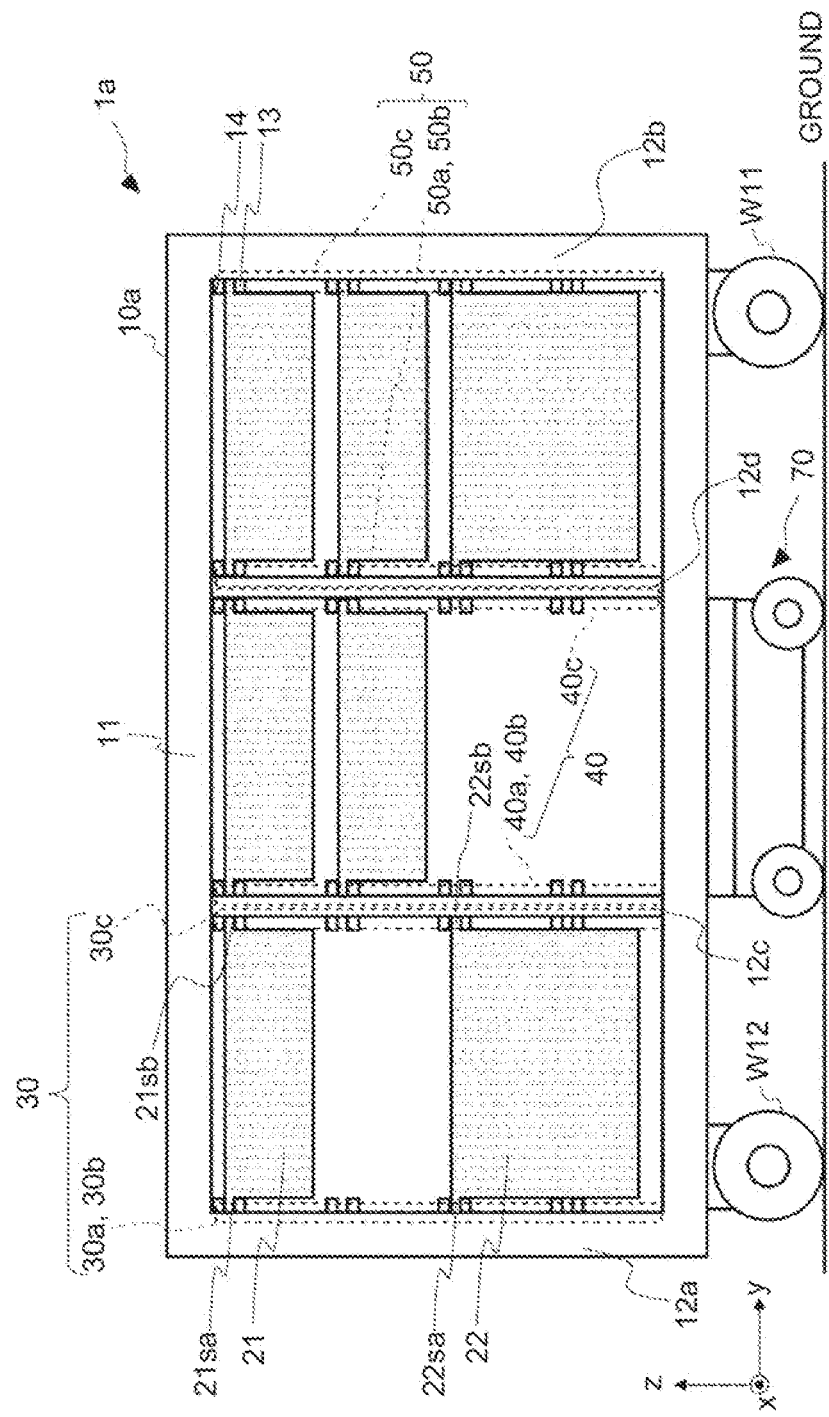
FIG. 9 is a schematic side view of a delivery vehicle according to a second embodiment.

Next, a delivery vehicle according to a second embodiment will be described with reference to FIG. 9 and FIG. 10. FIG. 9 is a schematic side view of the delivery vehicle according to the second embodiment, and FIG. 10 is a schematic side view of a transfer robot.

As shown in FIG. 9, in a delivery vehicle 1a according to this embodiment, a rack 10a corresponding to the rack 10 in the delivery vehicle 1 shown in FIG. 1 is adapted to house returnable containers in L rows (in this example of the configuration, L=3). The following description focuses on differences from the first embodiment. In this embodiment, L is an integer not less than two, and when L is common to the first and second embodiments, L is an integer not less than one.

The delivery vehicle 1a according to this embodiment is provided with partition plates 12c, 12d to separate rows in the rack 10a. As shown in FIG. 9, the partition plates 12c, 12d are provided parallel to a front plate 12b and a back plate 12a constituting parts of a casing 11 (i.e., parallel to an xz-plane) so as to extend from one side to the other side of the casing 11. Here, the partition plates 12c, 12d are provided such that the interval between the front plate 12b of the casing 11 and the adjacent partition plate 12d, the interval between the back plate 12a of the casing 11 and the adjacent partition plate 12c, and the interval between the partition plate 12c and the partition plate 12d are equal.

A plurality of pairs of rails 13 is provided inside the rack 10a so as to extend in a depth direction (x-axis direction) on inner surfaces (the front plate 12b and the back plate 12a) of the casing 11 and the partition plates 12c, 12d and arrayed at regular intervals in a height direction (z-axis direction). The rack 10a is further provided with auxiliary parts 14 so as to face the rails 13. Here, the rails 13 and the auxiliary parts 14 are provided so as to rise from an inner surface of the casing 11 and the partition plates 12c, 12d in a substantially perpendicular direction.

Since the rack 10a can house returnable containers in L rows in a direction orthogonal to an up-down direction of the casing 11 (in a left-right direction), it is preferable that a lock mechanism be provided in each row. The rack 10a has a lock mechanism 30 provided in the first row from the left, and details of this lock mechanism 30 are as described in the first embodiment. Similarly, a lock mechanism 40 is provided in the middle row, and a lock mechanism 50 is provided in the first row from the right. The lock mechanism 40 has mechanisms 40a, 40b, 40c similar to mechanisms 30a, 30b, 30c, respectively, and the lock mechanism 50 has mechanisms 50a, 50b, 50c similar to the mechanisms 30a, 30b, 30c, respectively.

This configuration makes it possible to divide and house returnable containers in two or more rows and separately release the lock on each returnable container. Alternatively, the lock mechanism may be provided in only some of the L rows; for example, only one of the lock mechanisms 30, 40, 50 in one row (e.g., only the lock mechanism 30) may be provided.

As described above, in this example, the rack 10a can house returnable containers of two or more prespecified sizes and the same width in three rows in the y-axis direction. However, the configuration is not limited to this example, and L in this embodiment may be any integer not less than two. Thus, the rack 10a should be able to house returnable containers of two or more prespecified sizes in arbitrary L rows in the y-axis direction that is a direction orthogonal to the x-axis direction (of course, orthogonal also to the depth direction). The widths of the rows (distances in the y-axis direction) may be varied. While it is preferable in terms of management and delivery operation that the interval B at which the rails (supports) 13 are disposed be equal among the rows, the interval B may also be varied among the rows.

As shown in FIG. 9, in this embodiment, while the delivery vehicle 1a delivers the returnable containers 21, 22, a transfer robot 70 may be housed under the delivery vehicle 1a and mechanically or electromagnetically coupled thereto. The transfer robot 70 is an autonomous vehicle that, after the delivery vehicle 1a arrives in the vicinity of a delivery rack similar to the rack 10a, transfers the returnable containers 21, 22 (i.e., the articles) from the delivery vehicle 1a to that delivery rack. If the lock mechanism 30 etc. are electrically controllable, each returnable container can be easily locked and unlocked at the time of loading and unloading for transfer.

As shown in FIG. 10, the transfer robot 70 includes wheels W21, W22, a main body 71, a top plate 72, and a pillar 73. The two pairs of wheels W21, W22 are rotatably fixed under the main body 71 and driven by a driving source (not shown), such as a motor.

As shown in FIG. 10, the top plate 72 is coupled to the main body 71 through an extendable-contractable pillar 73. The top plate 72 is coupled at an upper end of the pillar 73, and the transfer robot 70 transfers the returnable containers 21, 22 with the returnable containers 21, 22 placed on the top plate 72. The pillar 73 has, for example, a telescopic extending-contracting mechanism and is extended and contracted by a driving source (not shown), such as a motor. As indicated by the outlined arrow in FIG. 10, changing the length of the pillar 73 can change the level of the top plate 72. Therefore, the returnable containers 21, 22 can be transferred from any housing place in the delivery vehicle 1a to any housing place in the delivery rack.

Here, the transfer robot 70 includes a manipulator (not shown), for example, and using the manipulator, moves the returnable containers 21, 22 from the delivery vehicle 1a to the top plate 72 and thus transfers them. Then, using the manipulator, the transfer robot 70 moves the returnable containers 21, 22 from the top plate 72 to the delivery rack.

In the configuration shown in FIG. 9, the transfer robot 70 may serve as a power source to move the delivery vehicle 1a. This means that the delivery vehicle 1a need not have a driving source for driving the wheels W11, W12. In this case, a plurality of (e.g., two) transfer robots 70 may be provided side by side in the y-axis direction to move the delivery vehicle 1a. The transfer robot 70 may be mounted on the delivery vehicle 1a or travel alongside the delivery vehicle 1a.

The configuration of the second embodiment is otherwise the same as that of the first embodiment and therefore will not be further described. The various application examples described in the first embodiment are applicable also in this embodiment. In one of these examples, the rack 10a of the delivery vehicle 1a may be a rack that can house returnable containers of one prespecified size. In another example, the rack 10a may have M pairs of supports that are provided in M tiers at regular intervals in the left-right direction (one of horizontal directions that is perpendicular to the depth direction), and each of the N shafts may be configured to be moved left and right (moved in the left-right direction) by a driving source. The example regarding the use of the transfer robot 70 can be implemented independently of the example regarding dividing and housing the returnable containers in two or more rows.

Third Embodiment

FIG. 11 is a schematic front view showing one example of a delivery rack according to a third embodiment.

As shown in FIG. 11, a delivery rack 10b according to this embodiment can adopt the same configuration as the rack 10a mounted on the delivery vehicle 1a of FIG. 9. While this will not be described in detail, the delivery rack 10b can include a casing 11, partition plates 12c, 12d, rails 13, auxiliary parts 14, and lock mechanisms 30, 40, 50.

The delivery rack 10b according to this embodiment can be installed as a place to which the returnable containers 21, 22 are moved from the delivery vehicle 1a according to the second embodiment, or can be installed as a rack in which the returnable containers 21, 22 to be delivered by the delivery vehicle 1a are stored beforehand. Thus, the delivery rack 10b can be used as a receiving place and a sending place in delivering articles using the returnable containers 21, 22. In the delivery rack 10b, the returnable containers 21, 22 that have become empty after the articles have been taken out can be collected as appropriate by the delivery vehicle 1a of FIG. 9.

The delivery rack 10b can also be provided outdoors. As an example of outdoor usage, the delivery rack 10b may be installed in the entrance or a corridor of an apartment complex. Further, the delivery rack 10b may be installed in a house, and may be provided indoors. The term "house" here covers an apartment complex, an office building, etc.

The delivery rack 10b may be provided so as to extend through an outer wall of a house. This configuration makes it possible to carry the delivered returnable containers 21, 22 into the delivery rack 10b from outdoors, and to take the returnable containers 21, 22 out of the delivery rack 10b on an inside of a residential space. The term "residential space" here covers an office space. In this case, for example, an outer door and an inner door (not shown) that can be opened and closed may be provided on an outdoor side and an indoor side of the delivery rack 10b, and an interlock mechanism that prevents the outer door and the inner door from opening at the same time may be provided. This can protect the privacy of people living in the house.

In addition, the various application examples described in the first and second embodiments are applicable also to the delivery rack according to this embodiment. For example, this delivery rack can adopt the same configuration as the rack 10 mounted on the delivery vehicle 1 of FIG. 1.

Others

In the above examples, the various control programs can be stored using various types of non-transitory computer-readable media and supplied to a computer. Non-transitory computer-readable media include various types of tangible storage media. Examples of non-transitory computer-readable media include a magnetic recording medium (e.g., a flexible disc, magnetic tape, and hard disk drive), a magneto-optical recording medium (e.g., a magneto-optical disk), a CD-ROM, a CD-R, a CD-R/W, and a semiconductor memory (e.g., a mask ROM, programmable ROM (PROM), erasable PROM (EPROM), flash ROM, and RAM). Alternatively, the programs may be supplied to a computer by various types of transitory computer-readable media. Examples of transitory computer-readable media include electric signals, optical signals, and electromagnetic waves. Transitory computer-readable media can supply the programs to a computer through a wire communication channel, such as a wire or an optical fiber, or a wireless communication channel.

The present disclosure is not limited to the above-described embodiments but can be changed as appropriate within a range that does not depart from the gist of the disclosure. For example, the height of the returnable container to be housed is not limited to being nearly a multiple of the interval B, if streamlining of delivery is not pursued and housing the returnable containers so as to be spaced apart in the height direction is tolerated. In the example where four pairs of rails 13 are provided as in FIG. 1, returnable containers of which the heights are, for example, 0.5, 1.5, 2.7, or 3.9 times the interval B can also be housed.

What is claimed is:

1. A delivery rack comprising:
   a casing;
   M pairs of supports, with M being an integer not less than three, that are provided inside the casing so as to extend in a depth direction and arrayed in M tiers at regular intervals in a predetermined direction that is one of an up-down direction and a left-right direction; and
   a lock mechanism that locks returnable containers housed by being supported so as to be slidable along the respective M pairs of supports,
   the delivery rack being able to house all the returnable containers of one or more prespecified sizes, wherein:
   the lock mechanism includes N shafts, with N being an integer not less than two and meeting $N<M \le 2^N-1$, that are movable in the predetermined direction and each have a stem that is provided so as to extend across all the M pairs of supports and M branches that branch off from the stem so as to correspond to the respective M pairs of supports;
   moving each of the N shafts in the predetermined direction enables switching between engagement and disengagement between the branches of the N shafts and N holes provided in each of the returnable containers housed on the respective M pairs of supports; and
   the branches are provided on the N shafts such that a combination of engagement and disengagement between the branches and the holes is different in each of the returnable containers housed on the respective M pairs of supports.

2. The delivery rack according to claim 1, wherein:
   protrusions that protrude from the returnable container toward outer sides in a direction orthogonal to the predetermined direction slide over the supports; and
   the holes are provided in the protrusions.

3. The delivery rack according to claim 2, wherein the holes are provided at ends of the protrusions in a longitudinal direction.

4. The delivery rack according to claim 1, wherein the lock mechanism has a driving source that separately and electrically drives each of the N shafts.

5. The delivery rack according to claim 1, wherein:
   the delivery rack is able to house returnable containers in L rows, with L being an integer not less than one, in a direction orthogonal to the predetermined direction of the casing; and
   the delivery rack includes the M pairs of supports and the lock mechanism in each row.

6. A delivery vehicle comprising a rack, wherein:
   the rack has:
   a casing;
   M pairs of supports, with M being an integer not less than three, that are provided inside the casing so as to extend in a depth direction and arrayed in M tiers at regular intervals in a predetermined direction that is one of an up-down direction and a left-right direction; and
   a lock mechanism that locks returnable containers housed by being supported so as to be slidable along the respective M pairs of supports,
   the rack being able to house all the returnable containers of one or more prespecified sizes;
   the lock mechanism includes N shafts, with N being an integer not less than two and meeting $N<M \le 2^N-1$, that are movable in the predetermined direction and each have a stem that is provided so as to extend across all the M pairs of supports and M branches that branch off from the stem so as to correspond to the respective M pairs of supports;
   moving each of the N shafts in the predetermined direction enables switching between engagement and disengagement between the branches of the N shafts and N holes provided in each of the returnable containers housed on the respective M pairs of supports; and
   the branches are provided on the N shafts such that a combination of engagement and disengagement between the branches and the holes is different in each of the returnable containers housed on the respective M pairs of supports.

7. The delivery vehicle according to claim 6, wherein:
   protrusions that protrude from the returnable container toward outer sides in a direction orthogonal to the predetermined direction slide over the supports; and
   the holes are provided in the protrusions.

8. The delivery vehicle according to claim 7, wherein the holes are provided at ends of the protrusions in a longitudinal direction.

9. The delivery vehicle according to claim 6, wherein the lock mechanism has a driving source that separately and electrically drives each of the N shafts.

10. The delivery vehicle according to claim 6, wherein:
the rack is able to house returnable containers in L rows, with L being an integer not less than one, in a direction orthogonal to the predetermined direction of the casing; and
the rack includes the M pairs of supports and the lock mechanism in each row.

11. The delivery vehicle according to claim 6, wherein the delivery vehicle is an autonomous vehicle.

* * * * *